Figure 1:
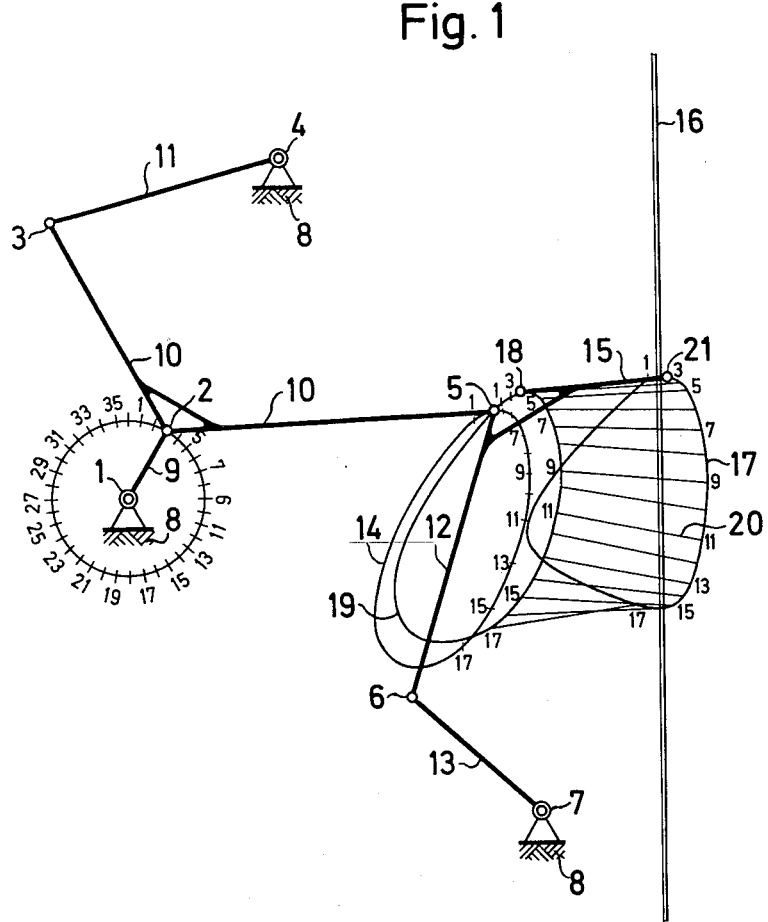

United States Patent [19]
Lohse

[11] 3,941,287
[45] Mar. 2, 1976

[54] FILM PULL-DOWN MECHANISM
[75] Inventor: Paul Lohse, Kissing, Germany
[73] Assignee: Firma Arnold & Richter KG, Munich, Germany
[22] Filed: May 16, 1974
[21] Appl. No.: 470,668

[30] Foreign Application Priority Data
May 18, 1973   Germany............................ 2325420

[52] U.S. Cl. ..................... 226/57; 226/64; 352/193
[51] Int. Cl.² ......................................... G03B 1/22
[58] Field of Search ........................ 226/62, 63–66, 226/69–73, 57; 352/192, 193

[56]         References Cited
            UNITED STATES PATENTS
2,749,798   6/1956   Ruhnau................................ 226/65

FOREIGN PATENTS OR APPLICATIONS
562,569   10/1932   Germany ............................... 226/62
634,792    9/1936   Germany ............................... 226/62
1,196,073  7/1965   Germany ............................... 226/62

Primary Examiner—Richard A. Schacher
Attorney, Agent, or Firm—Fleit & Jacobson

[57]        ABSTRACT

There is disclosed a film pull-down mechanism comprising a four-pivot linkage with two additional links attached thereto. The two additional links are mounted between a plane containing the film and a plane intersecting the drive means of the mechanism.

11 Claims, 3 Drawing Figures

FILM PULL-DOWN MECHANISM

This invention relates to a film pull-down mechanism comprising seven pivots, three of which are stationary, and which comprises a four-pivot linkage for generating a compound curve, and two additional links.

In the known mechanisms of that kind (Opened German Patent specification Nos. 2,132,576 and 2,132,577), the shuttle path (which is the pull-down curve of the pull-down claw) is determined by the four-pivot linkage so that the compound curve and the shuttle path coincide. To obtain an approximately satisfactory design as regards the pull-down curve of the pull-down claw and the position of the engaging surface of the pull-down claw relative to the perforation hole in the film, the driving crank mechanism is disposed near the film plane. At the same time, the transport-standstill ratio (this is the ratio of the time during which the shuttle moves the film strip to the time during which the film strip is stationary and can be exposed) should be suitable for the use of a high-speed shuttle. For this reason the four-pivot linkage must be extended by the provision of two additional links consisting of a slider linkage or a double-crank linkage and connected between the four-pivot linkage and its drive. In order to ensure an approximately satisfactory position of the pull-down claw relative to the film path and of the pulling side face of said claw relative to the film, the additional links must consist of long levers. For this reason the known film pull-down mechanism is not equally well suited for all motion picture cameras because some motion picture cameras lack the space required for the preceding links and the long links (levers) required for this purpose have a high inertia.

It is an object of the invention to provide a film pull-down mechanism which is of the kind defined first hereinbefore and which is compact and only by means of pivots and the two additional links members improves not only the transport-standstill ratio but also the position of the pull-down claw relative to the film path in such a manner that the pulling side face of said claw is approximately at right angles to the film plane particularly as the claw enters and leaves the perforation hole in the film.

In a film pull-down mechanism of the kind described first hereinbefore, this object is accomplished according to the invention in that the two additional links succeed the four-pivot linkage and that the additional link which carries the pull-down claw is pivoted at one end to the link which describes the compound curve and at the other end is connected by the second additional link to the third stationary pivot. In the film pull-down mechanism according to the invention the compound curve does not directly define the pull-down curve of the pull-down claw. The additional links which succeed the four-pivot linkage have a dual function and enable the provision of a compact mechanism whose members are connected only by pivots. The dual function of the succeeding additional links resides in that the transport-standstill ratio is improved as well as the position of the pull-down claw relative to the film path so that the pulling side face of said claw is approximately at right angles to the film particularly as the claw enters and leaves the perforation hole of the film.

As regards the compact structure which enables the use of the film pull-down mechanism according to the invention even in motion picture cameras using a quickchange cassette, another improvement will be obtained if the compound curve is determined by the arrangement of the pivots and the length of the links between the film plane and an imaginary plane which is parallel to the film plane and extends through the shuttle drive shaft. Particularly desirable in this respect is an embodiment of the invention in which the compound curve is generated between the film plane and the shuttle drive shaft.

For an improvement of the transport-standstill ratio and of the position of the pull-down claw relative to the film plane, the pull-down claw should be as nearly as possible at right angles to the film plane as the claw enters and leaves the perforation hole in the film strip. All of the planes in which the shuttle claw is instantaneously disposed are referred to as a set of positions. The curve generated by that point which determines the position of the contacting surface of the pull-down claw relative to the film path is one locus of said positions. The other locus is the side face of the shuttle claw. The point which generates the locus of the set must be selected so as to optimize the position of the contacting surface of the pull-down claw relative to the film path.

The invention also comprises a film-stepping mechanism, which comprises a film pull-down mechanism of the kind described and a registration member, and from this aspect is characterized in that the registration member consists of a rocker lever, which is pivoted near the film plane and has a registration pin which is arcuately shaped about the pivotal axis of said rocker lever, and the latter is connected by a coupling link to an additional, phase-displaced additional crankpin of the shuttle drive shaft. This film-stepping mechanism according to the invention affords a number of advantages. The registration member according to the invention is free of noise and wear in operation. It is less expensive, because a camwheel is saved, which would involve high manufacturing costs. Owing to the use of the pivot in conjunction with the curved registration pin, the motion of the registration member can be controlled in such a manner that a standstill thereof at its dead centers is avoided whereas there is no need of a cam slot control for this purpose. Experience has shown that mechanisms which involve a standstill at a point of reversal have a higher inertia and for this reason produce more noise. For this reason the registration member is pivotally connected also to a crank rather than to a camwheel.

Figure 2:
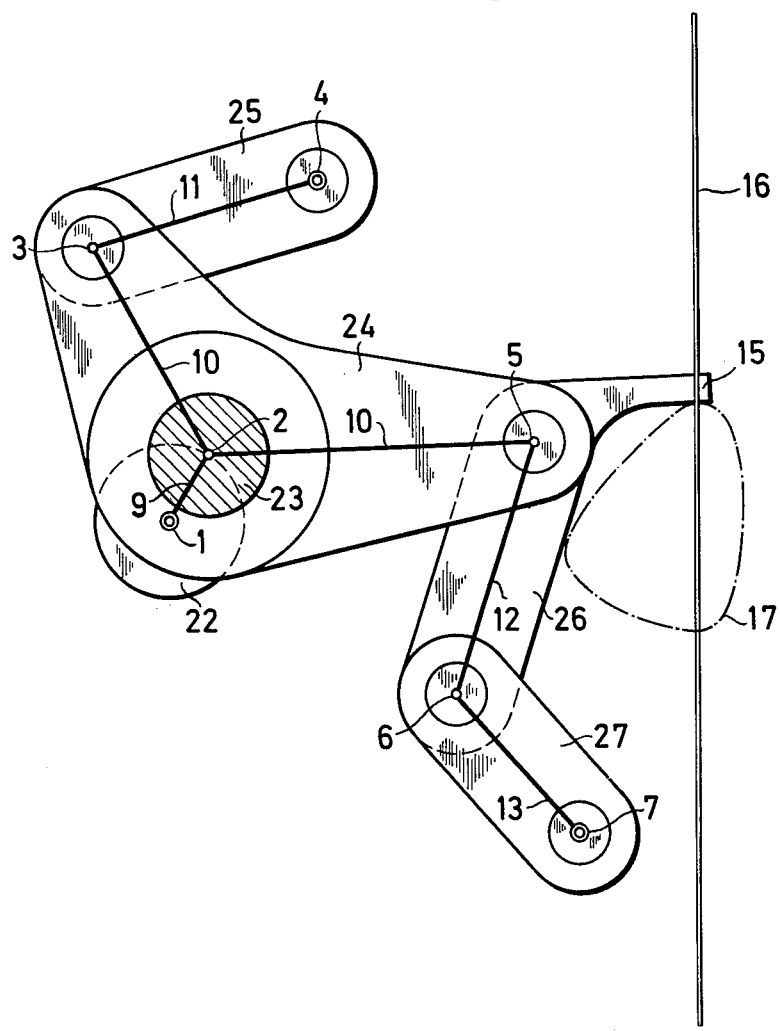
Figure 3:
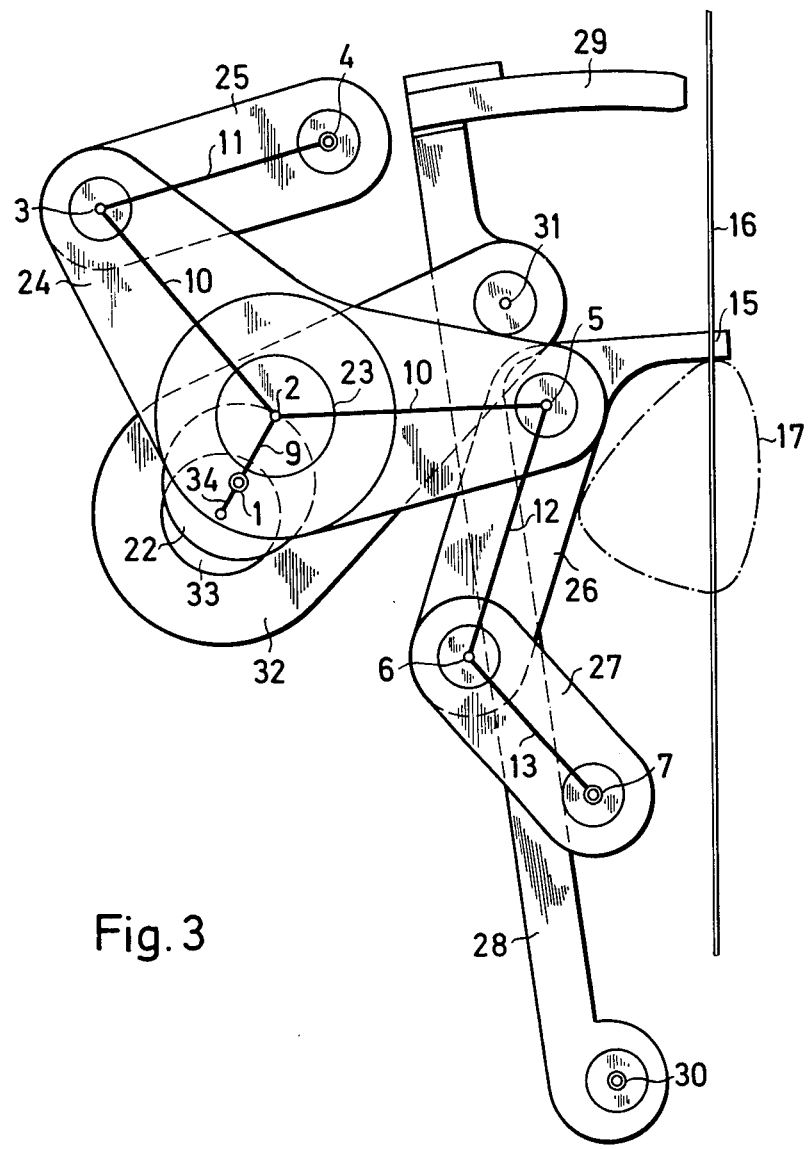

The invention will be described hereinafter by way of example with reference to the drawing, in which FIG. 1 is a basic representation of a film pull-down mechanism according to the invention, comprising seven pivot joints, three of which are stationary, FIG. 2 shows a practical embodiment of such film pull-down mechanism according to the invention, and FIG. 3 shows a practical embodiment of a film-stepping mechanism according to the invention, consisting of a film pull-down mechanism and a registration member.

The film pull-down mechanism according to the invention pulls down the film strip through an angle of, e.g., 120° so that the transport-standstill ratio is 1:3.

From the basic representation of the pull-down mechanism according to the invention shown in FIG. 1 it is apparent that the mechanism comprises seven pivot joints 1 to 7 and six links 8 to 13. Of the seven pivots, those designated 1, 4, and 7 are stationary pivots, which are mounted in a housing or frame, which constitutes the fixed link 8. The pivot 1 is the drive pivot. The crank pivot 2 connects the crank link 9 to the coupling link 10, which is connected by the pivot 3 to the rocker link 11. The latte is provided with the stationary pivot 4. The two additional links 12 and 13 are connected to the other end of the coupling link 10 by the pivot 5 and are interconnected by the pivot 6. The additional link 12 is formed as a unit with the pull-down claw 15. The additional link 13 is pivoted by the stationary pivot 7. The four-pivot linkage comprising pivots 1 to 4 and links 8 to 11 generates a so-called compound curve 14, which is described by the pivot 5, which is connected to the two succeeding additional links 12 and 13, which together with the pivots 6 and 7 and the four-pivot linkage constitute a seven-pivot linkage.

In accordance with the state of the art, the additional links are connected between the drive means and the four-pivot linkage. It is readily apparent from FIG. 1 that the two additional links 12 and 13 succeed the four-pivot linkage 1–2–3–4 when this is considered from the drive means or from the first stationary pivot 1. The film plane is designated 16. The shuttle path or the pull-down curve 17 of the pull-down claw 15 differs clearly from the compound curve 14, as is apparent from FIG. 1.

This is due to the positions of the claw tip 21 and of an individually determined point 18 relative to the pivot 5. The selection of these relative positions results in the pull-down curve 17 shown in FIG. 1 and in the set of planes 20 associated with the different positions of the pull-down claw 15. The point 18 generates a curve 19, which differs from the compound curve 14 and the pull-down curve 17 and which determines the successive planes of the set 20, which planes are occupied by the pull-down claw 15 in its consecutive positions.

The small numbers indicate the direction of movement of the crank pivot 2 and coordinate its positions with respective points of the compound curve 14, the locus 19 for the set of planes, and the pull-down curve 17 of the pull-down claw 15. For this reason the curves of the set 20 between the curves 17 and 19 represent the instantaneous angles between the pull-down claw 15 and the film plane 16.

A practical version of this embodiment is shown in FIG. 2. The first stationary pivot 1 is constituted by a shuttle drive shaft 22. The pivot 2 is constituted by a crankpin 23, which is part of the shuttle shaft 22. The eccentricity of this crankpin 23 relative to the center of the shuttle shaft (pivot 1) corresponds to the length of the crank link 9. The coupling link 10 is represented by a double-armed lever 24, which is pivoted to the crankpin 23. A rocker lever 25 corresponds to link 11, which is connected by the pivot 3 to the left-hand end of the double-armed lever 24 (coupling link 10). The right-hand end of the double-armed lever 24 in FIG. 2 carries the pivot 5, which connects the four-pivot linkage 1 to 4 to the two succeeding additional links 12 and 13. The center of pivot 5 describes the compound curve 14, which is represented in FIG. 1. In the embodiment of FIG. 2, the additional link 12 is represented by a lever 26, which carries the pull-down claw and which is connected by the pivot 6 to a lever 27, which constitutes the second additional link 13. The latter is pivoted by the third stationary pivot 7. This arrangement has the advantage that the lever 26 (additional link 12) made of a suitable material is integral with the pull-down claw 15. The film plane is designated 16 and the pull-down curve of the pull-down claw is designated 17. The desired approximately right-angled position of the pull-down claw 15, particularly as it enters and leaves the film plane 16, in accordance with the set of planes 20 shown in FIG. 1, is ensured by the selected position of the pull-down claw 15 on the lever 26. It will be readily understood that the position of the pull-down claw 15 relative to the lever 26 may be changed as has been fully explained with reference to FIG. 1 so that the set of planes 20 can be changed too. This would be equivalent to a change of point 18 in FIG. 1, which point describes the curve 19 in FIG. 1. The position of the stationary pivot 4 relative to the shuttle shaft 22 can be adjusted to a small extent to determine the exact extent of the pull-down stroke of the claw tip 21 relative to the pitch of the perforation holes in the film.

FIG. 3 shows a practical embodiment of a film-stepping mechanism according to the invention. That mechanism comprises a film pull-down mechanism according to FIG. 2 and a registration mechanism. Reference numbers used also in FIG. 2 mean that the structure is identical to that described with reference to FIG. 2. The registration mechanism comprises a rocker lever 28, which carries a registration pin 29, which is precisely shaped in accordance with an arc centered on the pivotal axis 30 of the rocker lever 28. The pivotal axis 30 of the rocker lever 28 is disposed near the film plane 16 and vertically adjustable. This adjustment permits of an exact positioning of the registration pin 29 relative to the perforation hole of the film when the pull-down claw 15 has pulled down the film and reached its end position. The rocker lever 28 carrying the registration pin 29 is connected by a pivot 31 to a connecting link 32 and the latter is connected to a second crankpin 33 of the shuttle drive shaft 22 so that the motions of the pull-down mechanism and of the registration mechanism are derived from one and the same shuttle shaft 22. The crankpin 33 of the registration mechanism belongs to a crank 34 and has such a phase displacement relative to the crankpin 23 for driving the pull-down mechanism so that synchronous motions and a correct phase relation between the pull-down claw 15 and the registration pin 29 are ensured.

What is claimed is:

1. A film moving mechanism having seven swivel joints, three of which joints are stationery and four of which joints are comprised in a four joint linkage which is adapted to generate a compound curve, and a rotating drive means, said mechanism comprising:
    two link members, one link member being attached to the four joint linkage and said two link members being mounted between a first plane containing the film and a second plane parallel to said first plane and intersecting the drive means; and
    a film pull-down claw connected to said one link member for engaging performations in the film and moving that film.

2. The mechanism of claim 1 wherein said pull-down claw comprises a pulling flank and is attached to said one link member so that said pulling flank engages and disengages from the film perforations at substantially right angles to the film.

3. The mechanism of claim 2, further including a point on said pull-down claw which point generates a generated curve as the drive means rotates, said pull-down claw being connected to said one link member so that positions assumed by said claw relative to the film correspond to similar positions on said generated curve.

4. The mechanism of claim 3 wherein said one link member and said film pull-down claw form a single unitary element.

5. The mechanism of claim 4 wherein the distance of travel of said film pull-down claw is adjusted by moving one swivel joint of the three stationary swivel joints.

6. The mechanism of claim 4, further including a crank pin connected to the drive means and wherein the four joint linkage comprises a pivoting lever connected to said one stationary swivel joint and a two-armed lever hingedly connected to said crank pin having one arm linked to said pivoting lever, and the other arm linked to said one link of said two additional link members.

7. The mechanism of claim 6 further including a registration mechanism comprising a rocker lever pivotably mounted at one end on a bearing point, a curved registration pin mounted on said rocker lever at the other end thereof and disposed adjacent said first plane, said bearing point being located at the center of curvature of said registration pin, a second crank pin connected to the drive means, a connecting link attached to said second crank pin and connected to said rocker lever, said second crank pin being connected to the drive means at a position displaced from said first crank pin.

8. The mechanism of claim 7 wherein the bearing point of said rocker lever is adapted to be vertically adjustable.

9. The mechanism of claim 4 wherein said single element is made of a hard alloy.

10. The mechanism of claim 1 wherein the other link of said two link members is attached at one end to another one of the stationary joints and at the other end to said one link member.

11. The mechanism of claim 1 wherein the compound curve is generated between said first and second planes.

* * * * *